United States Patent
Akiyama et al.

(10) Patent No.: US 8,424,427 B2
(45) Date of Patent: Apr. 23, 2013

(54) METHOD AND APPARATUS FOR ROLL SURFACE MACHINING

(75) Inventors: Takanobu Akiyama, Numazu (JP); Sumihisa Kondo, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/051,870

(22) Filed: Mar. 18, 2011

(65) Prior Publication Data

US 2011/0167968 A1 Jul. 14, 2011

Related U.S. Application Data

(63) Continuation of application No. 12/062,931, filed on Apr. 4, 2008.

(30) Foreign Application Priority Data

Apr. 5, 2007 (JP) ................................. 2007-99003

(51) Int. Cl.
*B23B 5/36* (2006.01)
*B23B 1/00* (2006.01)

(52) U.S. Cl.
USPC ................ 82/1.11; 82/70.1; 82/118; 409/304

(58) Field of Classification Search ............. 82/121, 82/123, 124, 131, 132, 137, 139, 153, 154, 82/159, 142, 148, 70.1, 101, 117, 118, 158, 82/161, 162, 157; 409/289, 292, 304, 305, 409/313, 293

See application file for complete search history.

(56) References Cited

U.S. PATENT DOCUMENTS

| | | | |
|---|---|---|---|
| 1,417,521 | A | 5/1922 | Haumann |
| 1,949,512 | A | 3/1934 | Norton |
| 2,028,293 | A | 1/1936 | OBrien et al. |
| 2,194,729 | A | 3/1940 | Wills |
| 2,222,206 | A | 11/1940 | Stone et al. |
| 2,235,578 | A | 3/1941 | Ford |
| 2,354,411 | A | 7/1944 | Thompson |

(Continued)

FOREIGN PATENT DOCUMENTS

| CN | 2541118 | 3/2003 |
|---|---|---|
| CN | 1491765 | 4/2004 |

(Continued)

OTHER PUBLICATIONS

Enalish Abstract of JP 11033801 published Feb. 9, 1999.

(Continued)

*Primary Examiner* — Andrea Wellington
*Assistant Examiner* — Sara Addisu
(74) *Attorney, Agent, or Firm* — DLA Piper LLP

(57) ABSTRACT

There is provided a roll surface machining method and apparatus for using a cutting tool to carry out ultra-precision machining in the surface of a roll with a reduced amount of data. The apparatus and method for roll surface machining includes setting a machining start position of a cutting tool with respect to the surface of the roll by C-axis indexing of the roll and positioning of the roll in the axial direction (Z-axis direction) both with respect to the cutting tool. Also the cutting tool and the roll are moved relative to each other in the axial direction of the roll by position control using C-Z axis interpolation, thereby forming a three-dimensional pattern in the surface of the roll.

9 Claims, 8 Drawing Sheets

U.S. PATENT DOCUMENTS

| | | | |
|---|---|---|---|
| 2,378,261 A | 6/1945 | Turney |
| 2,502,268 A | 3/1950 | Moss |
| 2,526,487 A | 10/1950 | Kurzweil |
| 2,534,333 A | 12/1950 | Wyrick |
| 2,559,138 A | 7/1951 | Waterson |
| 2,658,418 A | 11/1953 | Hoelscher |
| 2,677,310 A | 5/1954 | Campbell |
| 2,682,698 A | 7/1954 | Berthiez |
| 2,760,397 A | 8/1956 | Arpon |
| 3,017,697 A | 1/1962 | Wlodek |
| 3,125,931 A | 3/1964 | Stanaback |
| 3,159,065 A | 12/1964 | Diener |
| 3,348,057 A | 10/1967 | Burroughs |
| 3,449,985 A | 6/1969 | Eaves |
| 3,703,112 A | 11/1972 | Selby |
| 3,841,805 A | 10/1974 | Zalis |
| 3,985,049 A | 10/1976 | Streckfus |
| 3,996,454 A | 12/1976 | Froyd |
| 4,225,273 A | 9/1980 | Womack |
| 4,266,276 A | 5/1981 | Hayashi et al. |
| 4,461,121 A | 7/1984 | Motzer et al. |
| 4,617,503 A | 10/1986 | Davis |
| 4,617,764 A | 10/1986 | Reibakh |
| 4,761,891 A | 8/1988 | Sugimura |
| 4,766,788 A | 8/1988 | Yashiki et al. |
| 4,833,764 A | 5/1989 | Muller |
| 4,840,095 A | 6/1989 | Nussbaumer et al. |
| 4,876,931 A | 10/1989 | Bertini |
| 5,050,468 A | 9/1991 | Nydigger |
| 5,152,202 A | 10/1992 | Strauss |
| 5,197,228 A | 3/1993 | Sharkey et al. |
| 5,222,283 A | 6/1993 | Laschet |
| 5,289,622 A | 3/1994 | Minagawa |
| 5,946,991 A | 9/1999 | Hoopman |
| 5,964,016 A | 10/1999 | Ito et al. |
| 6,040,653 A | 3/2000 | O'Neill |
| 6,075,221 A | 6/2000 | Minhas |
| 6,457,391 B1 | 10/2002 | Yamazaki et al. |
| 6,578,254 B2 | 6/2003 | Adams |
| 6,865,789 B2 | 3/2005 | Katoh et al. |
| 6,868,304 B2 | 3/2005 | Uehara et al. |
| 6,945,147 B2 | 9/2005 | Sakashita |
| 6,952,627 B2 | 10/2005 | Olczak et al. |
| 7,089,836 B2 | 8/2006 | Kato et al. |
| 7,240,412 B2 | 7/2007 | Sasazawa et al. |
| 7,266,871 B2 | 9/2007 | Takeuchi et al. |
| 7,441,484 B1 | 10/2008 | Larsen |
| 2002/0008899 A1 | 1/2002 | Tanaka et al. |
| 2002/0082742 A1 | 6/2002 | Kadono |
| 2004/0003690 A1 | 1/2004 | Katoh et al. |
| 2004/0045419 A1 | 3/2004 | Bryan et al. |
| 2004/0050222 A1 | 3/2004 | Sakashita |
| 2004/0187654 A1 | 9/2004 | Kato et al. |
| 2007/0042160 A1 | 2/2007 | Nakajima |
| 2007/0251360 A1 | 11/2007 | Akiyama |
| 2007/0295175 A1 | 12/2007 | Akiyama |

FOREIGN PATENT DOCUMENTS

| | | |
|---|---|---|
| CN | 1736659 | 2/2006 |
| DE | 2935829 | 8/1980 |
| EP | 0403842 | 12/1990 |
| JP | 59-024943 A | 2/1984 |
| JP | 01-177924 A | 7/1989 |
| JP | 04-025301 | 1/1992 |
| JP | 04-283003 | 10/1992 |
| JP | 11033801 | 2/1999 |
| JP | 2001-328002 | 11/2001 |
| JP | 2001-336596 | 12/2001 |
| JP | 2002-079401 | 3/2002 |
| JP | 2002-160133 | 6/2002 |
| JP | 2002-346803 | 12/2002 |
| JP | 2003-94239 | 4/2003 |
| JP | 2004-223836 | 8/2004 |
| JP | 2004-344916 | 12/2004 |
| JP | 2004-345062 | 12/2004 |
| JP | 2004-358624 | 12/2004 |
| JP | 2005-022058 | 1/2005 |
| JP | 2005-527394 | 8/2005 |
| JP | 2005-537944 | 12/2005 |
| JP | 2006-000995 | 1/2006 |
| JP | 2006-130066 | 5/2006 |
| JP | 2006-135560 | 5/2006 |
| JP | 2006-156388 | 6/2006 |
| JP | 2006-165144 | 6/2006 |
| JP | 2006-166404 | 6/2006 |
| JP | 2006-334688 | 12/2006 |
| JP | 2007-320022 | 12/2007 |
| KR | 0251794 | 4/2000 |
| RU | 1815012 | 5/1993 |
| SU | 1227375 | 4/1986 |
| SU | 1741981 | 6/1992 |
| TW | M278500 | 10/2005 |
| WO | WO 03/101704 | 12/2003 |
| WO | WO 2004-024421 | 3/2004 |

OTHER PUBLICATIONS

English Translation of JP 11033801 published Feb. 9, 1999.
Office Action issued in Korean Appl 10-2009-65152 on Mar. 30, 2011.
English Translation of Office Action issued in Korean Appl 10-2009-65152 on Mar. 30, 2011.
English Abstract of JP 2002-346803 published Dec. 4, 2002.
English Translation of JP 2002-346803 published Dec. 4, 2002.
English Abstract of JP 2007-320022 published Dec. 13, 2007.
English Translation of JP 2007-320022 published Dec. 13, 2007.
Office Action issued in JP 2006-166404 on Mar. 29, 2011.
English Language Translation of Office Action issued in JP 2006-166404 on Mar. 29, 2011.
English Abstract of JP 2001-336596 published Dec. 7, 2011.
English Translation of JP 2001-336596 published Dec. 7, 2011.
English Language Abstract of JP 2004-345062 published Dec. 1, 2004.
English Language machine translation of JP 2004-345062 published Dec. 1, 2004.
English Language Abstract of JP 2003 94239 published Apr. 3, 2003.
English Language machine translation of JP 2003 94239 published Apr. 3, 2003.
English Language Abstract of JP 2004 358624 published Dec. 24, 2004.
English Language machine translation of JP 2004 358624 published Dec. 24, 2004.
Office Action Issued in Counterpart Korean Application No. 10-2007-0040936, Mailed Mar. 27, 2008.
English language translation of Korean Office Action issued in Application No. 10-2007-0040936, mailed Mar. 27, 2008.
English language abstract of JP 2002-160133, published Jun. 4, 2002.
English language abstract of JP 2005-022058, published Jan. 27, 2005.
Machine English language translation of JP 2002-160133, published Jun. 4, 2002.
Machine English language translation of JP 2005-022058, published Jan. 27, 2005.
Korean of Action issued in Application No. 10-2007-0040936 mailed Dec. 12, 2008.
Translation of Korean Offiice Action issued in Application No. 10-2007-0040936 mailed Dec. 12, 2008.
Korean Offiice Action issued in Application No. 10-2007-0057853 mailed Dec. 12, 2008.
Translation of Korean Offiice Action issued in Application No. 10-2007-0057853 mailed Dec. 12, 2008.
English Language Abstract of JP 2001-328002 published Nov. 27, 2001.
English Language Abstract of JP 2002-079401 published Mar. 19, 2002.
Korean Offiice Action issued in Application No. 10-2007-0058393 mailed Dec. 12, 2008.
Translation of Korean Offiice Action issued in Application No. 10-2007-0058393 mailed Dec. 12, 2008.
English language machine translation of JP 2001-328002 published Nov. 27, 2001.

English language machine translation of JP 2002-079401 published Mar. 19, 2002.
Chinese Office Action issued in Application No. 200710138844.2 mailed Feb. 27, 2009.
English Language Translation of Chinese Office Action issued in Application No. 200710138844.2 mailed Feb. 27, 2009.
English Language Abstract of CN 1736659 published Feb. 22, 2006.
Chinese Office Action issued in Application No. 200710138845.7 mailed Mar. 6, 2009.
English Translation of Chinese Office Action issued in Application No. 200710138845.7 mailed Mar. 6, 2009.
English Language Translation of Office Action issued in TW Appl 096121380 dated Aug. 26, 2009.
Office Action issued in TW Appl 096121380 dated Aug. 26, 2009.
English Language Translation of Office Action issued in TW Appl 096121381 dated Aug. 26, 2009.
Office Action issued in TW Appl 096121381 dated Aug. 26, 2009.
Office Action issued in Korean Application 10-2007-0057853 dated Oct. 19, 2009.
English Translation of Korean Office Action issued in KR Appl. 10-2007-0057853 dated Oct. 19, 2009.
English Language Abstract of KR 0251794 issued Apr. 15, 2000.
English Language Abstract of JP 2004-344916 published Dec. 9, 2004.
Machine translation of JP 2004-344916 published Dec. 9, 2004.
English Language Translation of Chinese Office Action in CN Appl 2008-10090587.4 on Sep. 4, 2009.
Chinese Office Action in CN Appl 2008-10090587.4 on Sep. 4, 2009.
English Language Abstract of JP 2004-223836 published Aug. 12, 2004.
English Translation of Office Action issued in Korean Appl 10-2008-0031455 on Dec. 18, 2009.
Office Action issued in Korean Appl 10-2008-0031455 on Dec. 18, 2009.
English Abstract of JP Publication 04-283003 published Oct. 8, 1992.
English Abstract of JP Publication 2005-537944 published Dec. 15, 2005.
English machine translation of JP Publication 2005-537944 published Dec. 15, 2005.
English language abstract of JP 2006-130066, published May 25, 2006.
Machine English language translation of JP 2006-130066, published May 25, 2006.
English language abstract of JP 2006-135560, published May 25, 2006.
Machine English language translation of JP 2006-135560, published May 25, 2006.
English language abstract of JP 2006-156388, published Jun. 15, 2006.
Machine English language translation of JP 2006-156388, published Jun. 15, 2006.
English language abstract of JP 2006-165144, published Jun. 22, 2006.
Machine English language translation of JP 2006-165144, published Jun. 22, 2006.
English language abstract of JP 2006-166404, published Jun. 22, 2006.
Machine English language translation of JP 2006-166404, published Jun. 22, 2006.
U.S. Appl. No. 11/762,511.
English Language Translation of JP 2004-223836 published Aug. 12, 2004.
English Language Translation of DE 2935829 published Aug. 1, 1980.
Office Action issued in Japanese Application No. 2006-123626 on Sep. 10, 2010.
English translation of Office Action issued in Japanese Application No. 2006-123626 on Sep. 10, 2010.
English Language Abstract of JP 59-024943A, published Feb. 8, 1984.
English Language Abstract of JP 01-177924A, published Jul. 14, 1989.
Taiwanese Office Action issued in TW 97111866 on Aug. 16, 2011.
English Language Translation of Taiwanese Office Action issued in TW 97111866 on Aug. 16, 2011.
U.S. Appl. No. 11/739,884.
U.S. Appl. No. 11/762,524.
U.S. Appl. No. 12/503,970.
U.S. Appl. No. 12/062,931.
Related U.S. Appl. No. 12/062,931.
Related U.S. Appl. No. 12/503,970.
Japanese Office Action issued in JP 2008-098054 on Nov. 27, 2012.
English Language Translation of Japanese Office Action issued in JP 2008-098054 on Nov. 27, 2012.
English Language Abstract of JP 2006-334688 published on Dec. 14, 2006.
English Language Translation of JP 2006-334688 published on Dec. 14, 2006.
English Language Abstract of JP 2005-527394 published Aug. 16, 2005.
English Language Translation of JP 2005-527394 published Aug. 16, 2005.
English Language Abstract of JP 2006-334688 published Sep. 15, 2005.
English Language Translation of JP 2006-334688 published Sep. 15, 2005.
English Language Abstract of JP 04-025301 published on Jan. 29, 1992.
English Language Abstract of JP 2006-000995 published on Jan. 5, 2006.
English Language Translation of JP 2006-000995 published on Jan. 5, 2006.

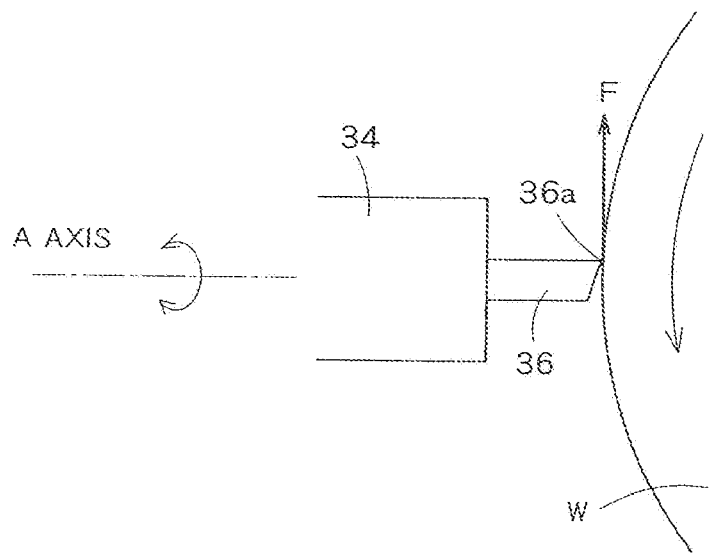
FIG. 5
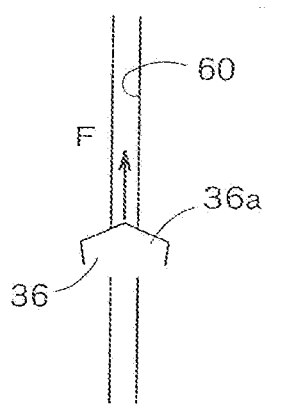   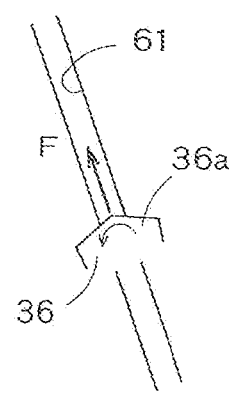
FIG. 6A     FIG. 6B

METHOD AND APPARATUS FOR ROLL SURFACE MACHINING

CROSS-REFERENCE APPLICATIONS

This application is a continuation of U.S. application Ser. No. 12/062,931 filed Apr. 4, 2008. U.S. application Ser. No. 12/062,931 is the non-provisional of Japanese Patent Application 2007-99003 filed Apr. 5, 2007. The entirety of all of the above-listed applications are incorporated herein by reference.

BACKGROUND OF THE INVENTION

1. Field of the Invention

The present invention relates to an method and a apparatus for roll surface machining to form a three-dimensional pattern of protrusions or recesses in the surface of a roll by using a cutting tool, and more particularly to a roll surface machining method and an apparatus for carrying out predetermined ultra-precision machining in the surface of a roll such as a roll mold for the production of, for example, an optical film for use in a liquid crystal display, a lenticular sheet for use in a rear projection TV, or a retroreflective sheet.

2. Background Art

A roll mold as described above has in the surface numerous fine protrusions or recesses on the order of several tens to several hundred μm. As described in Japanese Patent Laid-Open Publication No. 2004-344916, such a roll mold is produced, for example, by a method in which while rotating a roll and moving a cutting tool relative to the roll in the axial direction of the roll, the cutting tool is moved back and forth at a high speed in a cutting direction by means of a piezoelectric element, thereby forming circular or oval recesses in the roll surface, or a method in which grooves having inclined bottoms are machined at varying lead angles without moving a cutting tool in a cutting direction, thereby forming pyramidal protrusions in the roll surface.

In the production of such a roll mold, numerical control (NC) of the movements of the roll and a cutting tool is generally practiced. Because of the need for machining of the above-described large number of fine protrusions or recesses on the order of several tens to several hundred μm, huge volumes, of data are needed for the numerical control. This necessitates using a high-capacity NC apparatus or taking measures, such as decreasing a roll diameter, to reduce the amount of data.

SUMMARY OF THE INVENTION

It is therefore an object of the present invention to provide a roll surface machining method and an apparatus which solves the above problems in the prior art and makes it possible to machine a roll in order to forming patterns of fine protrusions or recesses on the roll surface with a reduced amount of data.

In order to achieve the object, the present invention provides a roll surface machining method for forming a three-dimensional pattern of protrusions or recesses in a helical arrangement at a predetermined lead angle in the surface of a roll by using a NC roll turning lathe provided with an indexing axis (C-axis) and Z-axis for controlling a position of a cutting tool in the axial direction, and a C-Z axis interpolation means, said method comprising the steps of: setting a machining start position of the cutting tool with respect to the surface of the roll by C-axis indexing of the roll and positioning of the roll in the axial direction (Z-axis direction) both with respect to the cutting tool; and rotating the roll at a predetermined speed and moving the cutting tool and the roll relative to each other at a predetermined speed in the axial direction of the roll by C-Z axis interpolation according to the lead angle, thereby forming the three-dimensional pattern in the surface of the roll, and repeating the said processes for forming the three-dimensional pattern in the surface of the roll, with setting the next machining start position of the cutting tool and carrying out the C-Z axis interpolation.

And the present invention provides a roll surface machining method for forming a three-dimensional pattern of protrusions or recesses in a helical arrangement at a predetermined lead angle in the surface of a roll by using a NC roll turning lathe provided with an indexing axis (C-axis) and Z-axis for controlling a position of a cutting tool in the axial direction, and a C-Z axis interpolation means, said method comprising the steps of: setting a machining start position of the cutting tool with respect to the surface of the roll by C-axis indexing of the roll and positioning of the roll in the axial direction (Z-axis direction) both with respect to the cutting tool; and rotating the roll at a predetermined speed and moving the cutting tool and the roll relative to each other at a predetermined speed in the axial direction of the roll by C-Z axis interpolation according to the feed velocity ratio instructed beforehand, thereby forming the three-dimensional pattern in the surface of the roll.

Another aspect of the present invention provides a roll surface machining apparatus for forming a three-dimensional pattern of protrusions or recesses in the surface of a roll, said apparatus comprising: a bed a headstock, mounted on the bed, having a main spindle for rotating a roll as a workpiece while holding one end of the roll by means of a chuck and an indexing axis (C-axis) for indexing the roll in the circumferential direction; a tail stock, mounted on the bed and disposed opposite the headstock, for rotatably supporting the other end of the roll; a carriage including a saddle mounted on the bed movably in the longitudinal direction (Z-axis direction) of the roll, and a table mounted on the saddle movably in a direction (X-axis direction) perpendicular to the longitudinal direction of the roll; a tool post mounted on the table and having a plurality of cutting tools attached thereto; and a NC control unit for rotating the roll at a predetermined speed and moving the cutting tool and the roll relative to each other at a predetermined speed in the axial direction of the roll by means of C-Z axis interpolation based on the predetermined ratio of the roll rotating speed and relative moving speed of the cutting tool.

The present invention has the following advantages:

The setting of the machining start position of a cutting tool with respect to the surface of a roll is performed by C-axis indexing of the roll and positioning of the roll in the axial direction (Z-axis direction) both with respect to the cutting tool. This manner of setting the machining start position does not incur an increase in the amount of data. Further, the formation of a three-dimensional pattern in the surface of the roll with the cutting tool is carried out by rotating the roll at a predetermined speed and moving the cutting tool and the roll relative to each other at a predetermined speed in the axial direction of the roll by C-Z axis interpolation. This enables machining of a roll without a large amount of data designating intermediate paths, and machining a larger-sized roll, e.g. a larger-sized roll mold, with the use of a smaller amount of data. Furthermore, in a case of machining of a three-dimensional pattern consisted of spiral groove on the roll surface, C-Z axis interpolation can be carried out according to a predetermined lead angle, as necessary.

BRIEF DESCRIPTION OF THE DRAWINGS

FIG. 5 is a diagram illustrating a machining position of the cutting edge of a cutting tool machining a circumferential groove in a roll;

FIGS. 6A and 6B are diagrams illustrating the action of A-axis for tilting of a cutting tool, FIG. 6A illustrating machining of a circumferential groove and FIG. 6B illustrating machining of a helical groove with a lead angle to the circumferential direction;

DETAILED DESCRIPTION OF THE PREFERRED EMBODIMENTS

Preferred embodiments of the present invention will now be described with reference to the drawings.

Figure 1:
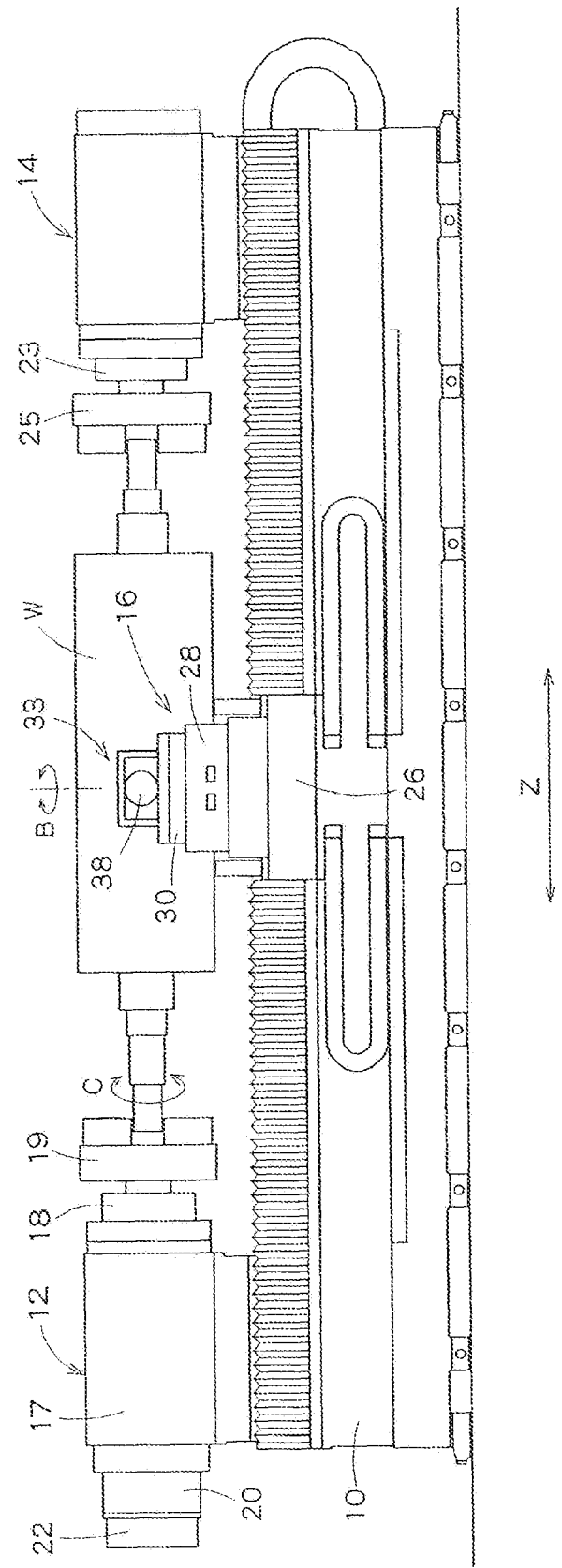
FIG. 1 is a front view of a precision roll turning lathe for carrying out a roll surface machining method according to the present invention.
Figure 2:
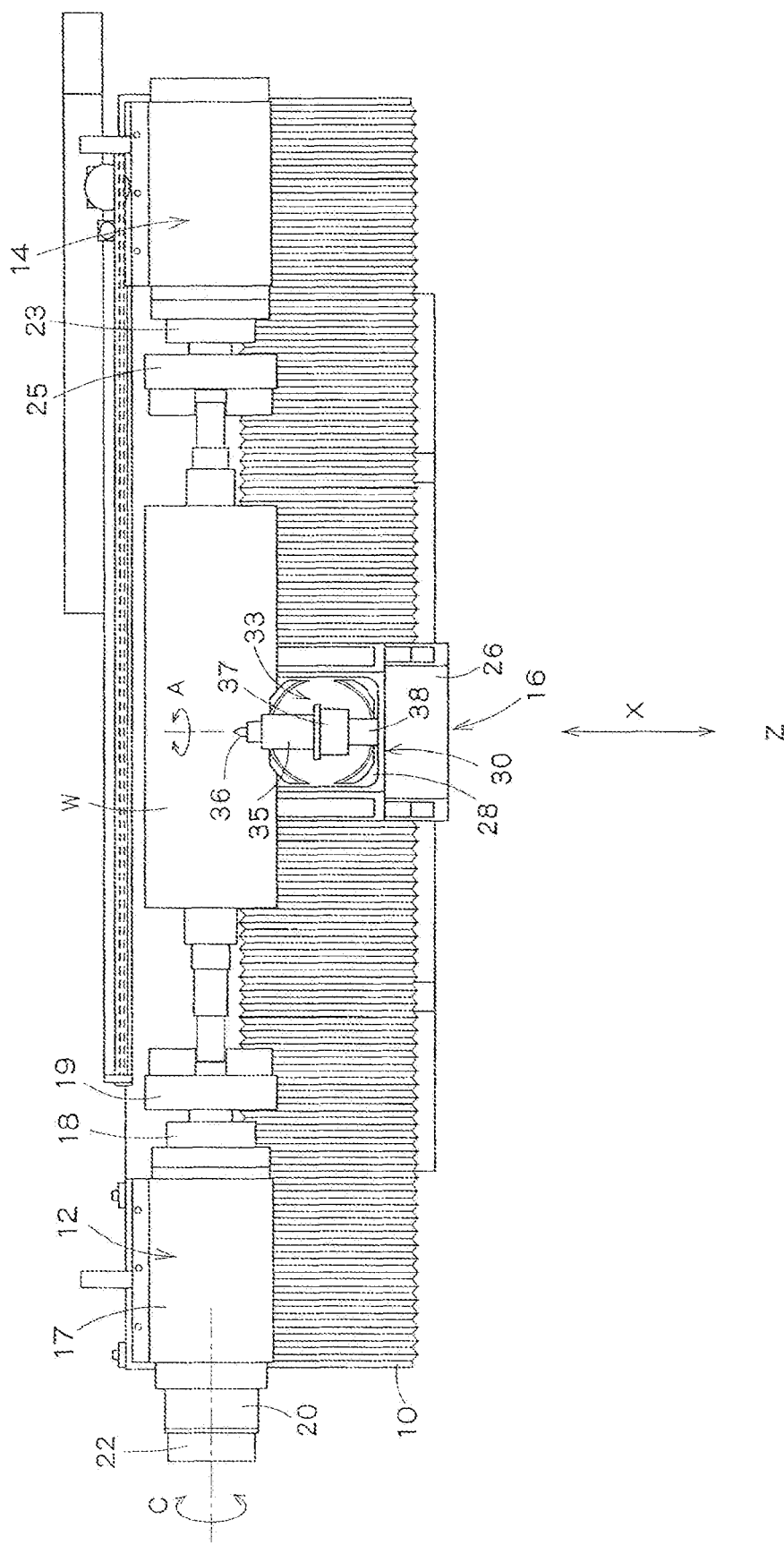
FIG. 2 is a plan view of the precision roll turning lathe.

FIG. 1 is a front view of a so-called precision roll turning lathe for carrying out a roll surface machining method according to the present invention, and FIG. 2 is a plan view of the precision roll turning lathe.

In FIGS. 1 and 2, reference numeral 10 denotes a bed. On the bed 10 are mounted a headstock 12, a tail stock 14 and a carriage 16. A roll W, a machining object, is rotatably supported by the headstock 12 and the tail stock 14.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is rotatably supported by a not-shown hydrostatic bearing provided within the body 17. The chuck 19 clamps a spindle of the roll W and transmits the rotation of the main spindle 18 to the roll W. In the headstock 12, the servo motor 20 rotates the roll W at a predetermined speed. The amount of revolution of the servo motor 20 is detected with an encoder 22 and the amount of revolution and rotational speed of the servo motor 20 is controlled, so that the servo motor 20 can also function as an indexing axis (C axis) for performing circumferential indexing of the roll W.

The tail stock 14 is disposed opposite the headstock 12 on the other longitudinal end of the bed 10. A not-shown guide surface, extending in the axial direction of the roll W, is provided on the upper surface of the bed 10 so that the tail stock 14 can be moved on the guide surface. The tail stock 14 has a rotatable shaft 23 instead of a conventional common tail spindle, and rotatably clamps a spindle of the roll W by means of a chuck 25 mounted to the shaft 23.

The carriage 16 includes a saddle 26 mounted on the bed 10 movably in the axial direction of the roll W. On the saddle 26 is mounted a table 28 movably in a direction perpendicular to the axial direction of the roll W. In this embodiment, the axis along which the saddle 26 is fed, i.e. the axis parallel to the axis of the roll W, is termed Z axis, and the axis along which the table 28 is fed on the saddle 26 is termed X axis.

Figure 3:
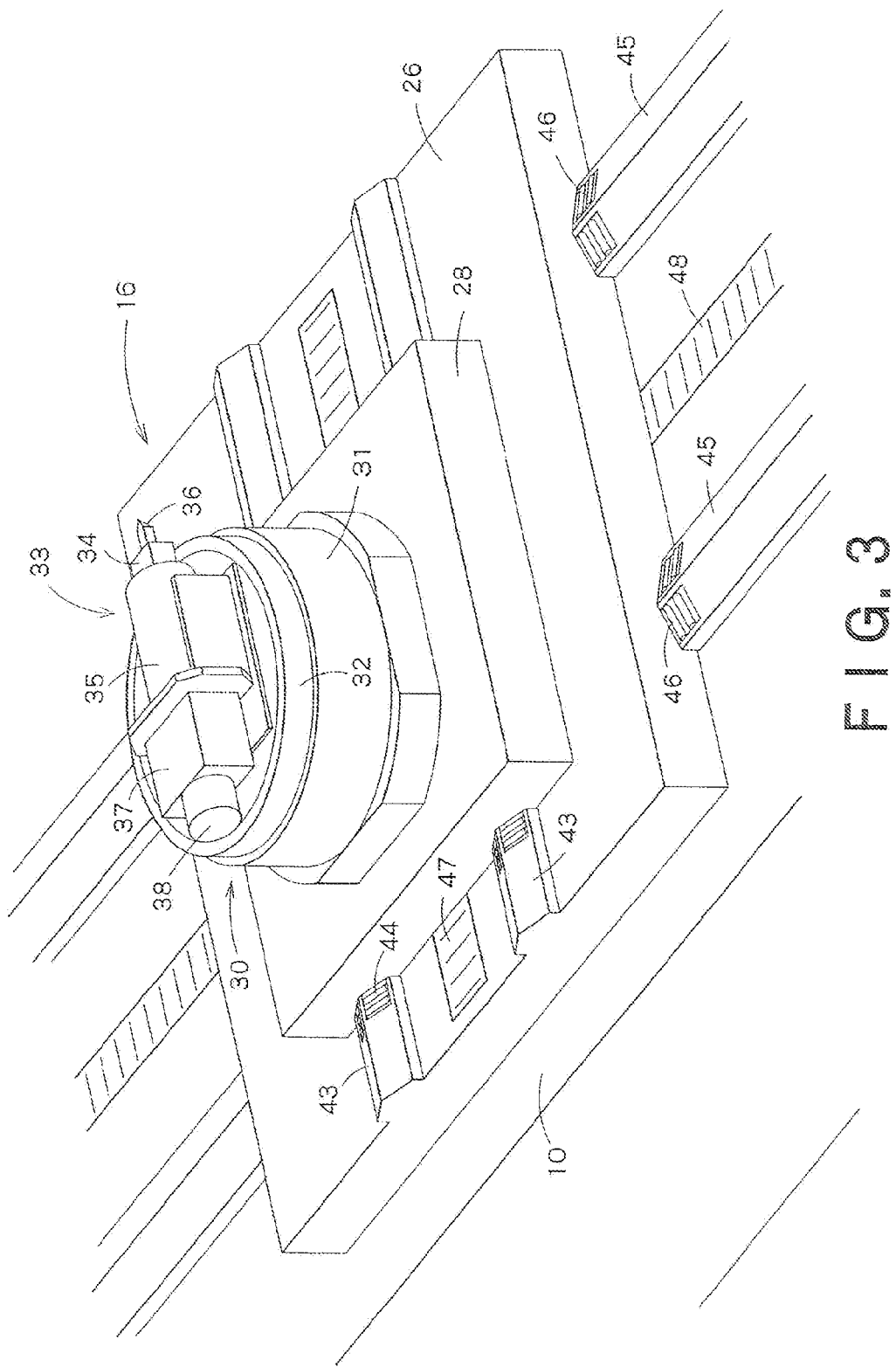
FIG. 3 is an enlarged perspective view of the tool swivel of the precision roll turning lathe.
Figure 4:
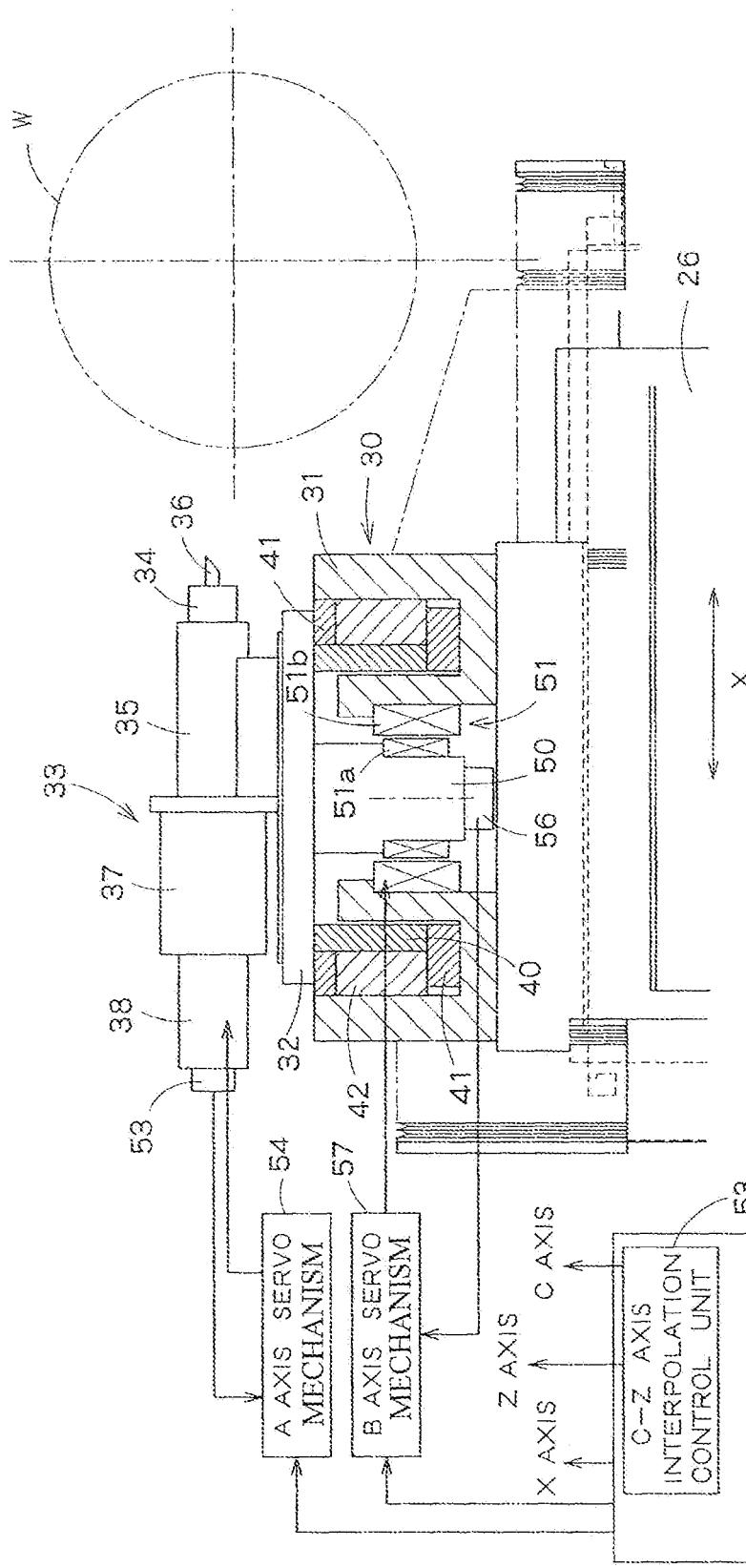
FIG. 4 is a partly sectional side view of the tool swivel on which a tool post, having a diamond cutting tool, is mounted.

FIG. 3 is an enlarged perspective view of a tool swivel 30, with covers being removed from the bed 10 and the saddle 26, and FIG. 4 is a sectional side view of the tool swivel 30. The tool swivel 30 according to this embodiment includes a swivel body 31 and a top board 32.

On the top board 32 of the tool swivel 30 is detachably mounted a tool post 33. The tool post 33 has a unitized structure in which a tool holder 34, a bearing 35, a speed reducer 37 and a servo motor 38 are integrated. The unitized tool post 33 can be mounted to and detached from the top board 32.

The tool holder 34 holds a diamond tool 36. It is, of course, possible to use a cutting tool of a metal having a high hardness, such as CBN or diamond-like carbon, instead of a diamond tool. The shaft of the tool holder 34 is rotatably supported by the bearing 35. To the bearing 35 is coupled the output shaft of the speed reducer 37, and to the output shaft is coupled the servo motor 38. Thus, the rotation of the servo motor 38 is slowed down by the speed reducer 37, and the slowed rotation is transmitted to the tool holder 34. The servo motor 38 is controlled so as to rotate the diamond tool 36 by a predetermined angle about an A axis, thereby tilting the diamond tool 36, as will be described later.

Referring to FIG. 4, an air bearing 40 is provided in the interior of the swivel body 31, and the top board 32 is mounted on the upper end of the air cylinder 40. The air bearing 40 is supported by a thrust bush 41 and a radial bush 42 rotatably with respect to the swivel body 31. A drive shaft 50 is coaxially mounted to the top board 32. A built-in servo motor 51 comprising a rotor 51a, which is secured to the drive shaft 50, and a stator 51b is provided within the swivel body 31. The drive shaft 50 is driven and rotated about a B axis by the servo motor 51, so that the tool post 33 swivels together with the top board 32 for indexing of the diamond tool 36 of the tool post 33.

Referring to FIG. 3, a pair of X-axis guide rails 43, each having an inverted V-shaped guide surface, extends on the upper surface of the saddle 26. Each X-axis guide rail 43 has a limited-type rolling guide 44 comprised of a large number of rollers held by a retainer. Similarly, a pair of Z-axis guide rails 45, each having an inverted V-shaped guide surface, extends on the upper surface of the bed 10. Each Z-axis guide rail 45 likewise has a limited-type rolling guide 46.

A Z-axis feed drive device for feeding the saddle 26 and an X-axis feed drive device for feeding the table 28 on which the tool swivel 30 is mounted are each comprised of a linear motor. In FIG. 3, reference numeral 47 denotes permanent magnet series which constitute the linear motor of the X-axis feed mechanism, and 48 denotes permanent magnet series that extend parallel to the Z-axis guide rails 45.

Referring to FIG. 4, reference numeral 52 denotes an NC apparatus. The NC apparatus 52 numerically controls the X axis, Z axis, B axis and C axis. With respect to the A axis, a position control loop is formed by an A-axis servo mechanism 54 and an encoder 53 which detects the inclination angle of the diamond tool 36. Based on comparison of a command from the NC apparatus 52 with a position feedback from the encoder 53, the servo motor 38 is controlled so that the cutting face of the diamond tool 36 will tilt by a commanded angle. With respect to the B axis, a position control loop is formed by a B-axis servo mechanism 57 and an encoder 56, and an indexing function is imparted to the air bearing 40.

The NC apparatus 52 is also connected to a not-shown C-axis servo mechanism including the servo motor 20, which rotates the roll W, and the encoder 22, and to a not-shown Z-axis servo mechanism including the linear motor which moves the saddle 26, in order to perform indexing of the roll W and positioning of the saddle 26. Further, the NC apparatus 52 has a C-Z axis interpolation function of synchronizing the rotation of the roll W and the movement of the saddle 26 at a predetermined, speed ratio based on a command with the use of the C-axis servo mechanism and the Z-axis servo mechanism.

A description will now be made of a roll surface machining method according to the present invention by means of the precision roll turning lathe having the above construction. FIG. 5 illustrates a machining position of the cutting edge of the diamond tool 36 machining a circumferential groove in the roll W, and FIG. 6A illustrates the relative positional relationship between a circumferential groove 60 and the cutting edge of the diamond tool 36. As shown in FIG. 6A, when machining the circumferential groove 60, the cutting face 36a of the diamond tool 36 forms a right angle with the groove direction F.

On the other hand, when machining a helical groove 61 with a lead angle, as shown in FIG. 6B, by feeding the diamond tool 36 in the Z-axis direction while rotating the roll W, it is not possible to carry out precision machining if the direction of the cutting face 36a of the diamond tool 36 remains as shown in FIG. 6A.

With the provision in the tool swivel 30 of the A axis for indexing of the inclination angle of the cutting face 36a of the diamond tool 36, according to this embodiment, it becomes possible to precisely tilt the diamond tool 36 as commanded so that the cutting face 36a of the diamond tool 36 will form a right angle with the direction of the helical groove 61 as shown in FIG. 6B. This enables precision machining of the helical groove 61.

Figure 7:
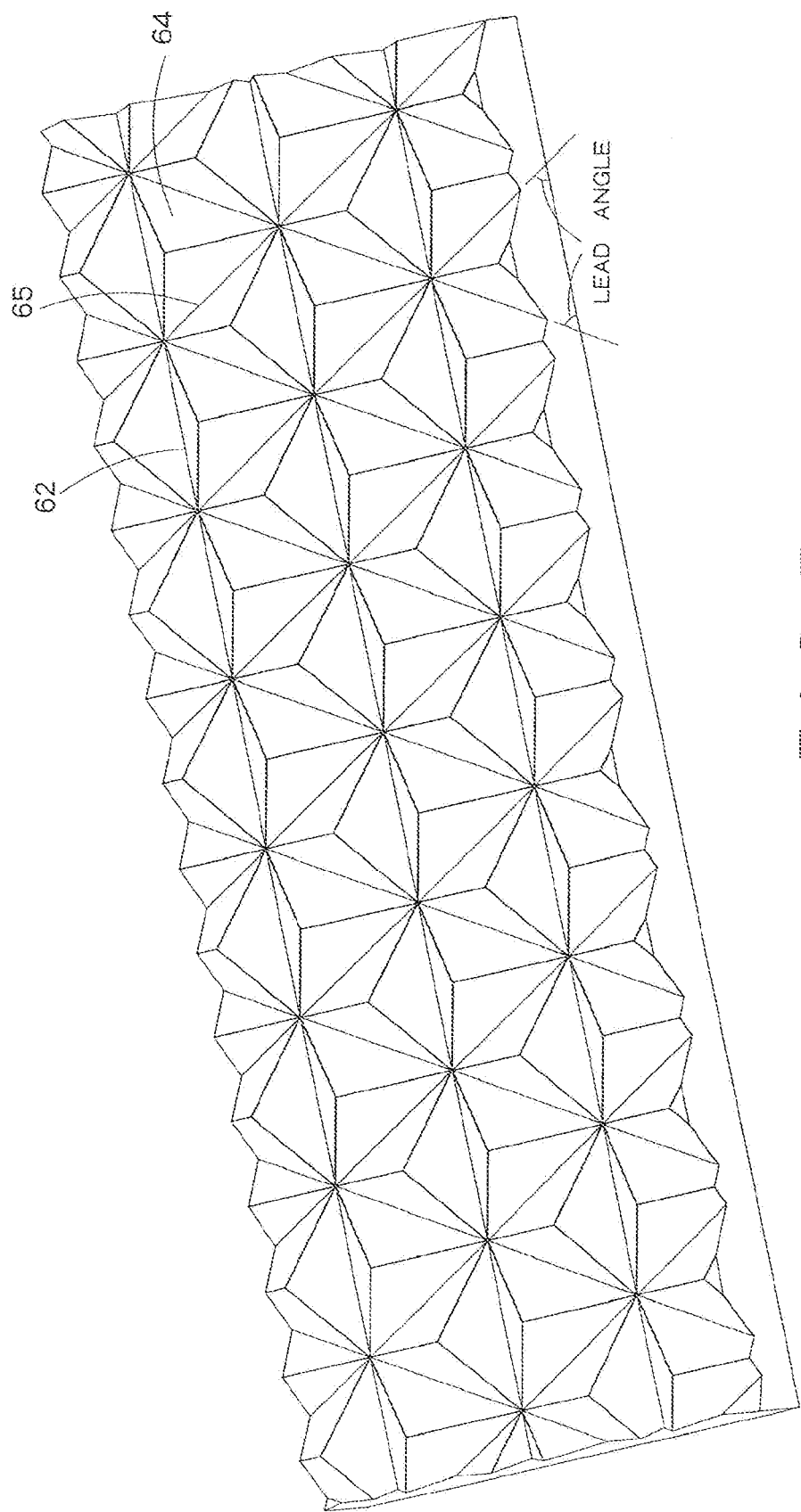
FIG. 7 is an enlarged partial view of a three-sided pyramid pattern which has been formed in a roll surface by the roll surface machining method of the present invention.

FIG. 7 is an enlarged partial view of a three-dimensional pyramid pattern which has been formed in a roll surface by the roll surface machining method of the present invention. The three-dimensional pattern consists of three-sided pyramids arranged in a helical pattern. In this embodiment, a transfer roll, e.g. for use in the production of a prism sheet or a retroreflective sheet which reflects an incident light back in the opposite direction to the incident direction, is produced by machining the three-dimensional pyramid pattern in the roll surface. Such a pattern of three-sided pyramids as in a prism sheet can be basically produced by machining V-shaped longitudinal grooves 62 in combination with first V-shaped helical grooves 64 and second V-shaped helical grooves 65, spiraling in opposite directions. In this embodiment the first helical grooves 64 and the second helical grooves 65 have the same helical angle, i.e. the same lead angle, in terms of the absolute value.

Machining of the first helical grooves 64 will now be described. The first helical grooves 64 are machined with the diamond tool 36 while rotating the roll W (about C-axis) in the direction of the arrow shown in FIG. 8A and feeding the diamond tool 36 in the axial direction (Z-axis direction) of the roll W. In particular, the cutting face of the diamond tool 36 of the tool post 33 is made perpendicular to an intended first helical groove 64 by rotating (tilting) the diamond tool 36 about the A axis, and the roll W is rotated (about C axis) by means of the servo motor 20 of the headstock 12. The diamond tool 36 is cut into the roll W, and then the carriage 16 is fed in the Z-axis direction, thereby machining the first helical groove 64.

During the machining, the speed of rotation of the roll W about the C axis and the moving speed of the diamond tool 36 in the Z-axis direction, i.e. the moving speed of the carriage 16, are synchronously controlled at a instructed speed ratio corresponding to a lead angle of the first helical groove 64 by the C-Z axis interpolation function of the NC apparatus 52. The position of the diamond tool 36 is synchronously controlled so that the diamond tool 36 cuts the surface of the roll W moving along a path corresponding to the lead angle. After thus machining the first helical groove 64 at a predetermined lead angle, C-axis indexing of the machining start position for the next first helical groove 64 and positioning of the diamond tool 36 in the Z-axis direction with the carriage 16 are carried out, and machining of the next groove 64 is carried out in the same manner as described above. In this manner, all the first helical grooves 64 are machined sequentially at a predetermined pitch.

Figure 8:
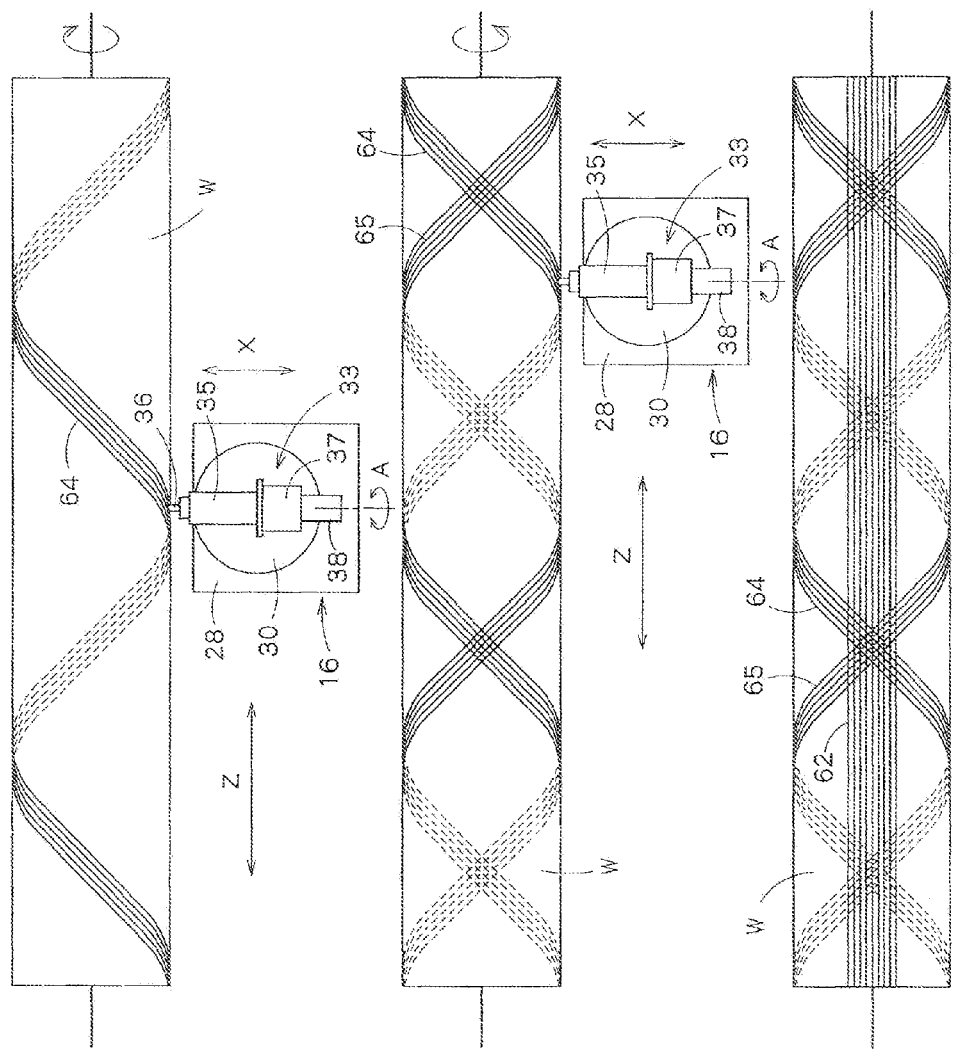
FIGS. 8A through 8C are diagrams illustrating the sequence of a process for machining the three-sided pyramids shown in FIG. 7, FIG. 8A illustrating machining of first helical grooves, FIG. 8B illustrating machining of second helical grooves whose helical direction is opposite to that of the first helical grooves, and FIG. 8C illustrating longitudinal grooves parallel to the axial direction of the roll.

Next, the second helical grooves 65, intersecting with and reversely spiraling to the first helical grooves 64, are machined by reversely rotating the roll W with the headstock 12 in the direction of the arrow shown in FIG. 8B and, as with the first helical grooves 64, feeding the diamond tool 36 with the carriage 16 in the Z-axis direction. During the machining, similarly to the first helical grooves 64, the speed of rotation of the roll W about the C axis and the moving speed of the diamond tool in the Z-axis direction, i.e. the moving speed of the carriage 16, are synchronously controlled at a instructed speed ratio corresponding to a lead angle of the second helical groove 65 by the C-Z axis interpolation function of the NC apparatus 52. C-axis indexing of the machining start position for the next second helical groove 65 and positioning of the diamond tool 36 in the Z-axis direction with the carriage 16 are carried out, and machining of the next groove 65 is carried out in the same manner as described above. In this manner, all the second helical grooves 65 are machined sequentially at a predetermined pitch. As described above, for example, machining of huge amount of the first helical grooves 64 and the second helical grooves 65, with pitch of several tens micro meters to hundreds micro meters, on the surface of the roll with 1 meter in length can be achieved by the C-Z axis interpolation. This enables machining of a roll without a large amount of data designating intermediate paths, and machining a larger-sized roll, e.g. a larger-sized roll mold, with the use of a smaller amount of data.

After thus machining the first helical grooves 64 and the second helical grooves 65, the longitudinal grooves 62 are machined as shown in FIG. 8C. Instead of the diamond tool 36 which has been used for machining of the helical grooves, a fly cutting spindle device 71 as shown in FIG. 9 is mounted to the front end of the tool holder 34 and used for machining of the longitudinal grooves 62.

Figure 9:
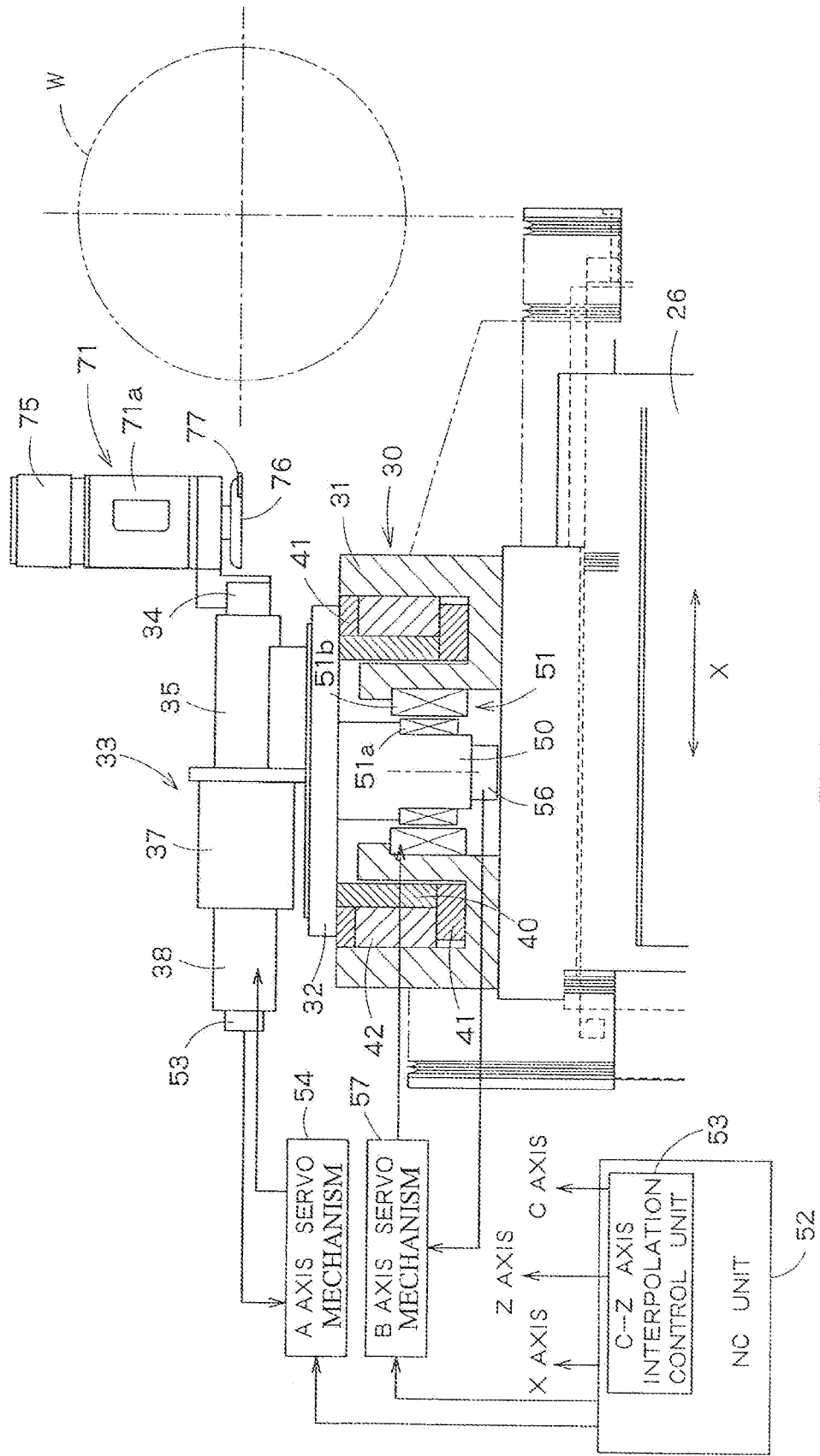
FIG. 9 is a partly sectional side view of the tool swivel of FIG. 4 on which the tool post, having a fly cutter spindle instead of the diamond cutting tool, is mounted.

As shown in FIG. 9, the fly cutting spindle device 71 includes a body 71a, a servo motor 75, and a cutter holder 76 having a fly cutter 77 (tool for fly cutting) attached thereto. A not-shown cutter spindle is supported by an air bearing in the interior of the body 71a. The cutter spindle is driven by the servo motor 75 which is controlled by a not-shown spindle control unit. The NC apparatus 52 send a command signal to the spindle control unit, and the spindle control unit controls the speed of the servo motor 75 based on the command signal. It is, of course, possible to control the servo motor 75 not by a signal from the NC apparatus 52, but by manual operation or by a servo motor control circuit of the NC apparatus 52. The cutter holder 76, which is mounted to the front end of the cutter spindle, is disk-shaped so as to increase the circumferential speed. One fly cutter 77, comprised of a diamond tool, is held on the peripheral surface of the cutter holder 76.

In this embodiment the fly cutting spindle device 71 supports the cutter spindle in a vertical position with respect to the X-axis direction and to the Z-axis direction, and the fly cutter 77 is disposed such that its cutting edge rotates at a high speed in the X-Z plane in which the A axis, i.e. the axis of the tool holder 34, lies.

Machining of the longitudinal grooves 62 by means of the fly cutting spindle device 71 is carried out in the following manner.

First, a circumferential position on the roll W, at which machining of a longitudinal groove 62 is to be started, is indexed by rotating the roll W about the C axis.

Next, the fly cutting spindle device 71 is driven to rotate the fly cutter 77 while the table 28 is fed in the X-axis direction to cause the fly cutter 77 to cut into the surface of the roll W. While maintaining the rotation of the fly cutter 77, the carriage 16 is fed in the Z-axis direction, thereby fly-cutting the longitudinal groove 62. The fly cutting spindle device 71 can provide an ideal cutting speed (about 300 m/min) to the fly cutter 77, enabling high-precision machining of the longitudinal groove 62.

Longitudinal grooves 62 are thus machined successively at a predetermined pitch such that the grooves 62 pass across the intersections of the first helical grooves 64 and the second helical grooves 65 while sequentially indexing on the C axis circumferential machining start positions on the roll W (see FIG. 8C).

Though in this embodiment machining in a roll surface of a three-dimensional pattern of three-sided pyramids (see FIG. 7) is carried out, it is of course possible to carry out machining in a roll surface of a three-dimensional pattern of four-sided pyramids in order to produce a roll W for processing of a retroreflective sheet having the three-dimensional pattern of four-sided pyramids on which air is less likely to remain. Machining of longitudinal grooves 62 is not necessary when machining a four-sided pyramid pattern, and thus the fly cutting spindle device 71 need not be used.

In machining of the first and second helical grooves 64, 65 in this embodiment, a predetermined cutting speed is obtained by the rotation of the roll W and the relative movement between the roll surface and the cutting edge of the diamond tool 36 upon the movement of the diamond tool 36 in the Z-axis direction. It is, however, also possible to use the fly cutting spindle device 71 to machine the first and second helical grooves 64, 65. In that case, the fly cutting spindle device 71 is tilted to meet the lead angle of the first or second helical grooves 64 or 65 by indexing on the A axis, i.e. the axis of the tool holder 34, and the rotating direction of the fly cutter 77 is specified. By machining the first and second helical grooves 64, 65 with the fly cutter 77, the cutting speed can be increased without being restricted by the rotating speed of the roll W.

Though in this embodiment a three-dimensional pattern of pyramids is formed by machining the first and second helical grooves 64, 65 and the longitudinal grooves 62, which are all continuous V-shaped grooves having a predetermined depth, such that they intersect with each other, the present invention is not limited to such machining. Thus, the present invention is also applicable to a machining method as described in the above-cited Japanese Patent Laid-Open Publication No. 2004-344916, i.e. a method in which while rotating a roll and moving a cutting tool, such as the diamond tool 36, relative to the roll in the axial direction of the roll, the cutting tool is moved back and forth at a high speed in a cutting direction by means of a piezoelectric element, thereby forming circular or oval recesses in the roll surface.

While the present invention can be advantageously applied especially to ultra-precision machining in the surface of a roll such as a roll mold for the production of, for example, an optical film for use in a liquid crystal display, a lenticular sheet for use in a rear projection TV, or a retroreflective sheet, the present invention is widely applicable to various types of roll surface machining which involve forming a three-dimensional pattern of protrusions or recesses in a helical arrangement at a predetermined lead angle in the surface of a roll by using a cutting tool.

The invention claimed is:

1. A roll surface machining method for forming a three-dimensional pattern of protrusions or recesses in a helical arrangement at a predetermined lead angle in the surface of a roll by using a NC roll turning lathe provided with an indexing axis (C-axis) roll motor and Z-axis motor for controlling a position of a cutting tool in the axial direction, and a NC control unit constructed and arranged to calculate C-Z axis interpolation data with a start position of the cutting tool and a lead angle as inputs using a C-Z axis interpolation function, said method comprising:
    setting a machining start position of the cutting tool with respect to the surface of the roll by C-axis indexing of the roll with respect to the cutting tool and positioning of the cutting tool in an axial direction (Z-axis direction) with respect to the roll; and
    rotating the roll and moving the cutting tool in the axial direction of the roll while controlling the position of the cutting tool to form a first groove in a first direction, reposition the tool to a second start position, and use the C-Z axis interpolation data to control the roll motor and the saddle motor to synchronize rotation of the roll and movement of the cutting tool in the axial direction of the roll starting from the second start position to form a second groove in the first direction, thereby forming the three-dimensional pattern in the surface of the roll, and repeating the setting and the rotating to form the three-dimensional pattern in the surface of the roll.

2. The roll surface machining method according to claim 1, wherein the three-dimensional pattern is a pattern of pyramidal protrusions.

3. The roll surface machining method according to claim 1, wherein a fly cutter is used as the cutting tool.

4. The roll surface machining method according to claim 3, wherein the three-dimensional pattern is formed through a further process of forming recess on the roll surface in the axial direction of the roll with a predetermined pitch.

5. The roll surface machining method according to claim 4, wherein the three-dimensional pattern is a pattern of triangular pyramidal protrusions.

6. The roll surface machining method according to claim 1, wherein the three-dimensional pattern is formed by using a cutting tool driven by means of a piezoelectric element in the radial direction of the roll.

7. The roll surface machining method according to claim 6, wherein the three-dimensional pattern is a pattern of circular or oval recesses.

8. The roll surface machining method according to claim 1, wherein the roll is a roll mold for the production of an optical film or a lenticular sheet.

9. A roll surface machining method for forming a three-dimensional pattern of protrusions or recesses in a helical arrangement at a predetermined lead angle in the surface of a roll by using a NC roll turning lathe provided with an indexing axis (C-axis) roll motor and Z-axis motor for controlling a position of a cutting tool in the axial direction, and a NC control unit constructed and arranged to calculate C-Z axis interpolation data with a start position of the cutting tool and a lead angle as inputs using a C-Z axis interpolation function, said method comprising:

setting a machining start position of the cutting tool with respect to the surface of the roll by C-axis indexing of the roll with respect to the cutting tool and positioning of the cutting tool in an axial direction (Z-axis direction) with respect to the roll; and rotating the roll and moving the cutting tool in the axial direction of the roll while controlling the position of the cutting tool by using the C-Z axis interpolation data with the start position and lead angle as inputs to synchronize rotation of the roll and the movement of the cutting tool to form a first groove in a first direction, reposition the tool to a second start position, and use the C-Z axis interpolation data to control the roll motor and the saddle motor to synchronize rotation of the roll and movement of the cutting tool in the axial direction of the roll starting from the second start position to form a second groove in the first direction, thereby forming the three-dimensional pattern in the surface of the roll.

\* \* \* \* \*